US008972513B2

(12) United States Patent
Martini

(10) Patent No.: US 8,972,513 B2
(45) Date of Patent: Mar. 3, 2015

(54) CONTENT CACHING

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 13/959,613

(22) Filed: Aug. 5, 2013

(65) Prior Publication Data
US 2015/0039713 A1 Feb. 5, 2015

(51) Int. Cl.
G06F 15/16 (2006.01)
H04L 29/08 (2006.01)

(52) U.S. Cl.
CPC .................................. *H04L 67/2842* (2013.01)
USPC ........................................................ 709/206

(58) Field of Classification Search
None
See application file for complete search history.

(56) References Cited

U.S. PATENT DOCUMENTS

| | | | |
|---|---|---|---|
| 6,192,382 B1 | 2/2001 | Lafer et al. | |
| 6,351,767 B1 | 2/2002 | Batchelder et al. | |
| 6,591,266 B1 | 7/2003 | Li et al. | |
| 7,035,911 B2 * | 4/2006 | Lowery et al. | 709/217 |
| 7,409,433 B2 * | 8/2008 | Lowery et al. | 709/214 |
| 7,689,661 B2 * | 3/2010 | Lowery et al. | 709/214 |
| 7,975,032 B2 * | 7/2011 | Lowery et al. | 709/221 |
| 8,135,812 B2 * | 3/2012 | Lowery et al. | 709/221 |
| 8,271,628 B2 * | 9/2012 | Lowery et al. | 709/221 |
| 8,504,663 B2 * | 8/2013 | Lowery et al. | 709/221 |
| 8,788,703 B1 | 7/2014 | Martini | |
| 2002/0107935 A1 * | 8/2002 | Lowery et al. | 709/216 |
| 2002/0120727 A1 | 8/2002 | Curley et al. | |
| 2002/0184364 A1 * | 12/2002 | Brebner | 709/224 |
| 2003/0009563 A1 * | 1/2003 | Douglis et al. | 709/227 |
| 2003/0023766 A1 | 1/2003 | Elnozahy | |
| 2003/0126197 A1 * | 7/2003 | Black et al. | 709/203 |
| 2004/0148393 A1 * | 7/2004 | Breiter et al. | 709/225 |
| 2004/0255048 A1 * | 12/2004 | Lev Ran et al. | 709/249 |
| 2005/0005027 A1 * | 1/2005 | Drouet et al. | 709/245 |
| 2005/0223084 A1 * | 10/2005 | Cheng | 709/219 |
| 2006/0190607 A1 * | 8/2006 | Lowery et al. | 709/226 |
| 2007/0223474 A1 | 9/2007 | Shankar | |

(Continued)

OTHER PUBLICATIONS

Liu et al., "WebCQ—Detecting and Delivering Information Changes on the Web," *CIKM '00*, 2000, 8 pages.

(Continued)

*Primary Examiner* — Brian P Whipple
(74) *Attorney, Agent, or Firm* — Fish & Richardson P.C.

(57) ABSTRACT

A gateway within a network intercepts a request by a client within the network for content associated with a server outside the network, the client having a direct connection with the server outside the network. The method further includes determining whether a copy of the requested content is available in a cache within the network. The method further includes, if the copy of the requested content is determined to be available in the cache within the network, transmitting a redirect response to the client to cause the cause to retrieve the copy of the requested client from the cache within the network. The method further includes if the copy of the requested content is determined not to be available in the cache within the network, permitting the intercepted content request by the client to be transmitted to the server outside the network to cause the requested content to be retrieved via the direct connection between the server outside the network and the client within the network.

24 Claims, 6 Drawing Sheets

(56) References Cited

U.S. PATENT DOCUMENTS

| | | | |
|---|---|---|---|
| 2008/0010410 A1* | 1/2008 | Zilbershtein et al. | 711/118 |
| 2008/0243992 A1* | 10/2008 | Jardetzky et al. | 709/203 |
| 2008/0294745 A1* | 11/2008 | Lowery et al. | 709/214 |
| 2009/0199250 A1* | 8/2009 | Assouline et al. | 725/96 |
| 2010/0138485 A1* | 6/2010 | Chow et al. | 709/203 |
| 2010/0185745 A1* | 7/2010 | Lowery et al. | 709/214 |
| 2011/0258623 A1* | 10/2011 | Wagner et al. | 718/1 |
| 2011/0302266 A1* | 12/2011 | Lowery et al. | 709/214 |
| 2012/0179773 A1* | 7/2012 | Lowery et al. | 709/213 |
| 2012/0191804 A1 | 7/2012 | Wright et al. | |
| 2012/0239811 A1* | 9/2012 | Kohli et al. | 709/226 |
| 2013/0007188 A1* | 1/2013 | Lowery et al. | 709/213 |
| 2013/0124667 A1* | 5/2013 | Chow et al. | 709/213 |
| 2013/0155090 A1 | 6/2013 | Pourbigharaz et al. | |

OTHER PUBLICATIONS

Ramaswamy et al., "Automatic Fragment Detection in Dynamic Web Pages and Its Impact on Caching," *IEEE Transactions Knowledge Data Engineering*, 2005, 17(6):859-874.

* cited by examiner

CONTENT CACHING

BACKGROUND

A computer network is a collection of computers and other hardware interconnected by communication channels that allow sharing of resources and information. Communication protocols define the rules and data formats for exchanging information in a computer network. A cache is a mechanism that can store and serve data. For example, a web cache may store web content from servers so that clients can access the content from the cache more quickly than from the servers.

Web proxies are a common component in many computer network environments. They are used for a variety of purposes including saving bandwidth and providing a controlled path out to the Internet from a local network. Web proxies store content from the Internet in a cache so that if access to that same content is later sought by a computer being serviced by the proxy, the web proxy can fetch the requested content from the local cache instead of retrieving another copy from the Internet.

SUMMARY

In one aspect, a method is performed by data processing apparatuses. The method includes intercepting, at a gateway within a network, a request by a client within the network for content associated with a server outside the network, the client having a direct connection with the server outside the network. The method further includes determining whether a copy of the requested content is available in a cache within the network. The method further includes, if the copy of the requested content is determined to be available in the cache within the network, transmitting a redirect response to the client to cause the cause to retrieve the copy of the requested client from the cache within the network. The method further includes if the copy of the requested content is determined not to be available in the cache within the network, permitting the intercepted content request by the client to be transmitted to the server outside the network to cause the requested content to be retrieved via the direct connection between the server outside the network and the client within the network.

Implementations can include any, all, or none of the following features. The method including preventing, if the copy of the requested content is determined to be available in the cache within the network, the request from reaching the server outside the network. Determining whether a copy of the requested content is available in a cache within the network includes determining whether the content is static. Determining if the content is static includes examining a file extension of the content. Determining whether the content is static comprises matching the resource to a list of known static contents. The method including monitoring content returned to clients within the network by servers; determining that a first plurality of the contents are static; and responsive to determining that the first plurality of the contents are static, storing the first plurality of contents in the cache. Determining that the first plurality of contents is static includes examining file extensions of the contents. Determining that the first plurality of contents is static includes comparing multiple contents with the same name and determining that the multiple contents contain identical data. Determining that the first plurality of contents is static includes comparing a message containing the content returned to clients with a threshold. Storing the first plurality of contents in the cache includes requesting, from a server outside of the network, the first plurality of contents. The request is a Hypertext Transfer Protocol (HTTP) request, the content is a single HTTP resource, the redirect is an HTTP redirect, and the cache indexes stored content by HTTP resource name.

In one aspect, a computer storage media encoded with computer program instructions that, when executed by one or more processors, cause a computer device to perform operations includes intercepting, at a gateway within a network, a request by a client within the network for content associated with a server outside the network, the client having a direct connection with the server outside the network. The operations further include determining whether a copy of the requested content is available in a cache within the network. The operations further include, if the copy of the requested content is determined to be available in the cache within the network, transmitting a redirect response to the client to cause the cause to retrieve the copy of the requested client from the cache within the network. The operations further include if the copy of the requested content is determined not to be available in the cache within the network, permitting the intercepted content request by the client to be transmitted to the server outside the network to cause the requested content to be retrieved via the direct connection between the server outside the network and the client within the network.

Implementations can include any, all, or none of the following features. The operations further include preventing, if the copy of the requested content is determined to be available in the cache within the network, the request from reaching the server outside the network. Determining whether a copy of the requested content is available in a cache within the network includes determining whether the content is static. Determining if the content is static includes examining a file extension of the content. Determining whether the content is static includes matching the resource to a list of known static contents. The operations further include monitoring content returned to clients within the network by servers; determining that a first plurality of the contents are static; and responsive to determining that the first plurality of the contents are static, storing the first plurality of contents in the cache. Determining that the first plurality of contents is static includes examining file extensions of the contents. Determining that the first plurality of contents is static includes comparing multiple contents with the same name and determining that the multiple contents contain identical data. Determining that the first plurality of contents is static includes comparing a message containing the content returned to clients with a threshold. Storing the first plurality of contents in the cache includes requesting, from a server outside of the network, the first plurality of contents. The request is a Hypertext Transfer Protocol (HTTP) request, the content is a single HTTP resource, the redirect is an HTTP redirect, and the cache indexes stored content by HTTP resource name.

In one aspect, a system includes one or more processors configured to execute computer program instructions. The system further includes computer storage media encoded with computer program instructions that, when executed by one or more processors, cause a computer device to perform operations that include intercepting, at a gateway within a network, a request by a client within the network for content associated with a server outside the network, the client having a direct connection with the server outside the network. The operations further include determining whether a copy of the requested content is available in a cache within the network. The operations further include if the copy of the requested content is determined to be available in the cache within the network, transmitting a redirect response to the client to cause the cause to retrieve the copy of the requested client from the cache within the network. The operations further include if the copy of the requested content is determined not to be available in the cache within the network, permitting the intercepted content request by the client to be transmitted to the server outside the network to cause the requested content to be retrieved via the direct connection between the server outside the network and the client within the network.

Implementations can include any, all, or none of the following features. The operations further include preventing, if the copy of the requested content is determined to be available in the cache within the network, the request from reaching the server outside the network. Determining whether a copy of the requested content is available in a cache within the network includes determining whether the content is static. Determining if the content is static includes examining a file extension of the content. Determining whether the content is static includes matching the resource to a list of known static contents. The operations further include monitoring content returned to clients within the network by servers; determining that a first plurality of the contents are static; and responsive to determining that the first plurality of the contents are static, storing the first plurality of contents in the cache. Determining that the first plurality of contents is static includes examining file extensions of the contents. Determining that the first plurality of contents is static includes comparing multiple contents with the same name and determining that the multiple contents contain identical data. Determining that the first plurality of contents is static includes comparing a message containing the content returned to clients with a threshold. Storing the first plurality of contents in the cache includes requesting, from a server outside of the network, the first plurality of contents. The request is a Hypertext Transfer Protocol (HTTP) request, the content is a single HTTP resource, the redirect is an HTTP redirect, and the cache indexes stored content by HTTP resource name.

Implementations can include any, all, or none of the following features.

The systems and processes described here may be used to provide a number of potential advantages. By identifying static contents on a webpage and dynamic contents on a webpage, a cache can store only the static contents. When a client later requests the webpage, the static portions of the webpage can be served from the cache and the dynamic portions can be served from the webpage server. This arrangement can reduce the load time of a webpage and reduce the bandwidth out of the network needed to access the webpage. In a HTTP connection established between a client and a server where multiple HTTP requests for resources are sent in parallel, caching on the HTTP resource level allows a one-to-one mapping between HTTP requests and cache content, which can allow for computationally simple cache serving. Cache misses may be minimized or eliminated by redirecting only those requests that the cache knows are cacheable or are already stored in the web cache.

DESCRIPTION OF DRAWINGS

Like reference symbols in the various drawings indicate like elements

DETAILED DESCRIPTION

Figure 1:
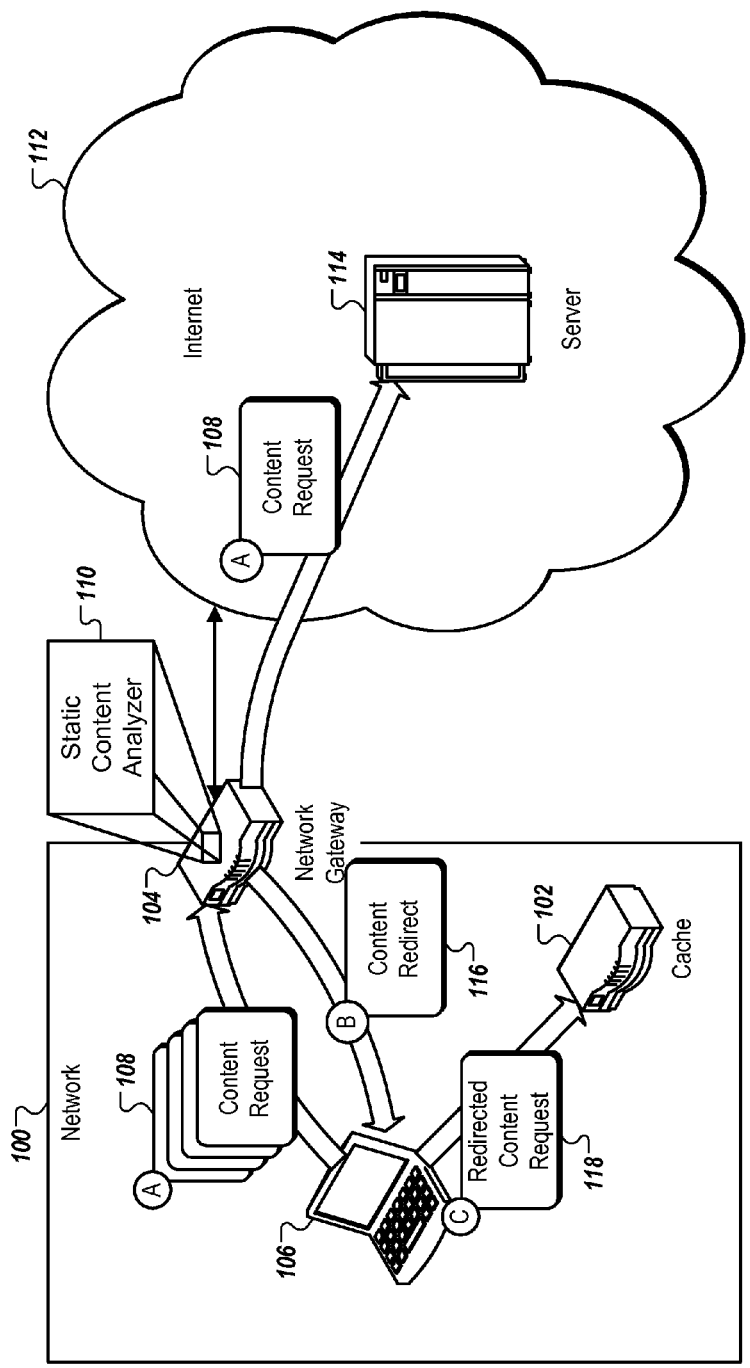
FIG. 1 is a block diagram of a network with a static content cache serving content.

According to the systems and techniques described herein, a computer network can use a cache to store static contents of a document and allow dynamic portions of the same document to be served from the web server hosting the document. For example, many web pages are made up of many resources. Some of the resources (e.g., a side-bar graphic, navigation links) are static; that is, their data remains unchanged for a least some period of time. Other resources may be dynamic. A dynamic resource may change its data based on the user requesting the webpage, the time of the request, or based on some other dynamic data being displayed (e.g., a social network feed, stock prices). In the example of such a webpage, a web cache can store and serve the static components (e.g., the side-bar graphics and navigation links resources), and can allow requests for the dynamic components (e.g., stock prices and social network feed) to reach the web server of the page. This disparate treatment of static and dynamic resources can enable users to receive the correct dynamic content from the web server while receiving, possibly faster and with less bandwidth, the static contents from the cache.

In many communication protocols, including but not limited to Hypertext Transport Protocol (HTTP), a requesting client is permitted to establish multiple, parallel, connects to issue multiple, parallel content requests to a server. By caching data of the same type as is specified by the communication protocol, the cache can service an entire request by itself. For example, a HTTP GET request can request one resource per message, and the cache may store and index content as individual and individually addressed resources.

A network may use a web cache configuration known as transparent caching. With transparent caching, a web browser or other requester, which uses traditional protocols to fetch content from the internet, may not be aware that it is fetching content from a web cache. This may, in some cases, simplify the deployment of a web cache on a network because there may be no need to push proxy configurations to a computer using the cache.

In an example of caching static content with a transparent cache, the following steps may be performed by a network and/or network administrator in the course of a client requesting content that may come from a cache:

1) Configure a cache that does not intercept or otherwise require all requests to be forced through the cache. Thus, computers may have direct access to the Internet, via the below-noted gateway.

2) Configure a gateway that traffic must traverse in order to fetch content from the Internet. This gateway may be completely transparent to the computers, meaning that the computers are unaware that traffic to/from the computers necessarily is routed through the gateway.

3) The computer establishes a direct connection (e.g., with no in-line proxy or cache) to the web server on the Internet.

4) The computer sends a HTTP(s) GET or POST request to the web server on the Internet.

5) The Internet-aware gateway intercepts this GET/POST request, before it leaves the network in which the computer resides, and determines whether the requested content is already in the cache.

6) If the requested content is in the cache, the GET/POST request is not transmitted to the intended web server. Rather, the gateway sends a redirect response to the computer with a Universal Resource Locator (URL) that points to the cache (which is within the same network as the requesting computer), and which contains the information required for the cache to retrieve the content.

7) The computer sees the redirect, closes the connection to the original server, and makes the request to the cache from which the requested content is retrieved.

In the alternative when requested content is not in the cache, the process changes from step 6 above:

Alt 6) If the requested content is NOT in the cache, no redirect is sent and the computer continues to fetch the content from the web server thus offloading the cache, meaning that the cache need not be involved in the content fetch, thereby reducing the load on the cache.

There are many different potential methods for filling the web cache. One technique involves the gateway's determining whether content for a specific URL is static based on HTTP(s) response sent to computers and a web server, and, if so, then storing that specific URL in a table indicating the next request to that URL should be retrieved from the cache. The threshold criteria for when to save retrieved web content to the web cache can be configured so that only content that has a cache life expectancy of a certain amount of time is redirected to the cache. For example, if content is only static (e.g., remains unchanged at the source URL) for a few minutes based on the expiration time in the HTTP(s) response, it may not be advantageous to redirect those requests to the cache since they may expire too often, causing unnecessary burden on the web cache.

FIG. 1 is a block diagram of a network 100 with a cache 102 serving content and a network gateway 104. Also shown in the network 100 is a client device 106, which represents any appropriate computing device capable of browsing resources outside of the network 100. While not shown for clarity's sake, the network 100 can include other elements including, but not limited to, wireless and/or wired access points, file and/or application servers, routers, and network cables, as well as additional browser devices 106, network gateways 104, and/or caches 102.

The network 100 can be configured to route some or all of the messages addressed outside the network to the gateway 104. For example, the client device 106 can create and send content requests 108 to the network gateway 104. The network gateway 104 can inspect the content requests 108. For example, a static content analyzer 110 can determine if the requested content is available from the cache 102, if the requested content is static, etc.

If the network gateway 104 determines that the requested content is not available from the cache 102, the network gateway 104 can route the content request 108 to the external network (e.g., the Internet) 112 and on to the server 114 that hosts the requested content. The server 114 may then process the content request as normal (e.g., serving the content or issue an error code.)

If the network gateway 104 determines that the requested content is available from the cache 102, or that the content may be available from the cache 102, the network gateway 104 may issue a content redirect 116 to the client device 106. In some cases, the gateway 104 may determine that the requested content is available from the cache 102 with perfect accuracy. In other cases, the gateway 104 that the requested content is available from the cache 102 with some error. Errors may occur, for example, if the gateway 104 determines that content is static, but where the content has not yet been cached. The content redirect 116 may be, for example, a HTTP redirection message, that specifies a redirection to the cache 102. The content redirect 116 may include all information needed to identify the content within the cache 102 including, but not limited to, the original address of the content request 108.

The client device 106 may receive the content redirect 116 and send a redirected content request 118 to the cache 102. The cache 102 may receive the redirected content request 118 and process as appropriate. For example, if the cache 102 contains a copy of the requested content, the cache 102 can return the requested content, and if the cache 102 does not contain a copy of the requested content, sometimes referred to as a cache miss, the cache 102 can request the resource to be served to the client device 106 from the server 114. A cache miss may occur, for example, if content in the cache expires during the redirect process, or if the gateway 104 errs in determining if content is static.

Figure 2:
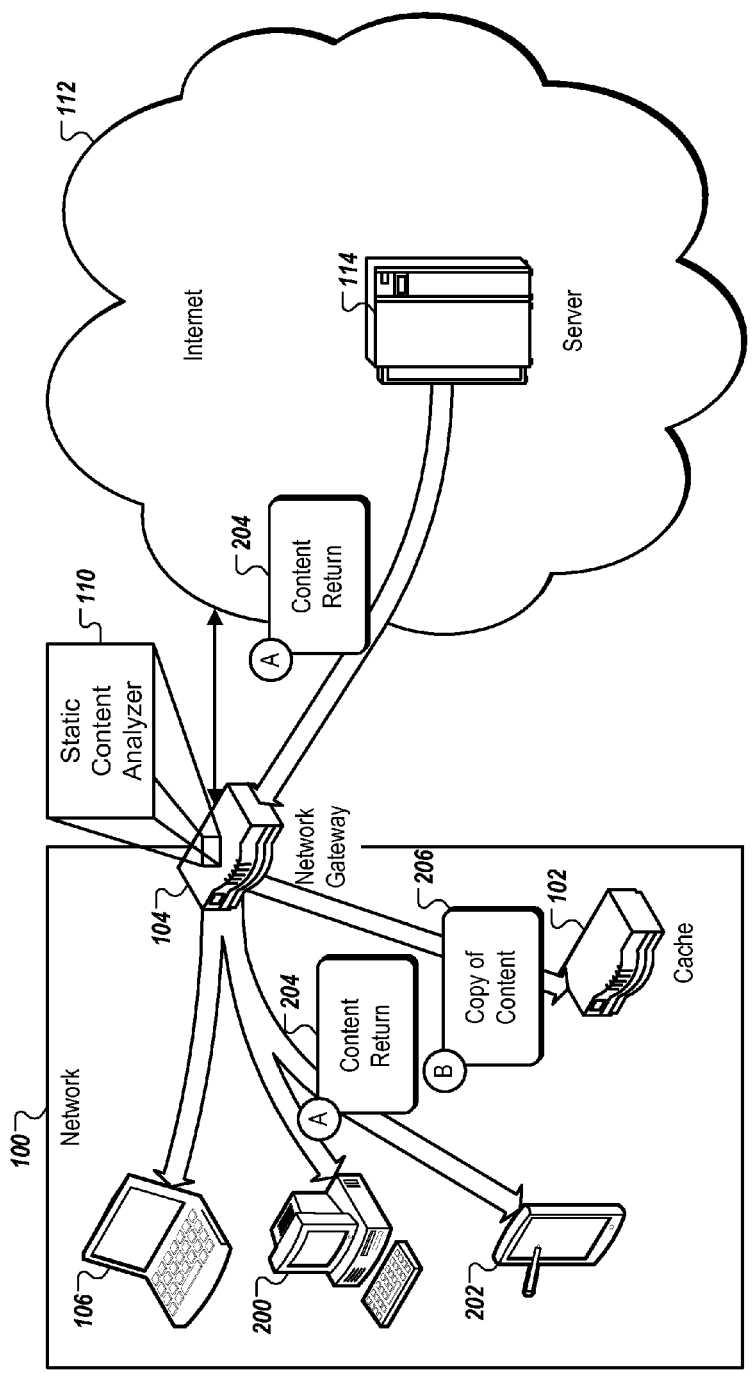
FIG. 2 is a block diagram of a network with a static content cache storing content.

FIG. 2 is a block diagram of the network 100 with a static content cache storing content. The description of FIG. 1 includes examples where data is requested from the server 114 and where data is requested from the cache 102. FIG. 2, by way of comparison, will be used as the basis of examples where data served by the server 114 is added to the cache 102.

In FIG. 2, the server 114 has received, from the client 106 or another client 200 or 202, a request for content. The server 114 can respond to the request for content with a content return message 204. The content return message 204 can be routed from the server 114 to the network gateway 104. The network gateway 104 may receive the content return message 204 and route the content return message 204 to the addressed client device (e.g., client device 106, 200, or 202).

In addition, the network gateway 104 may also determine if a copy of the content of the content return message 204 should be stored in the cache 102. For example, the static content analyzer 110 may determine that that the content is static, is not stored in the cache 102 and/or passes any other appropriate tests for storage.

If the network gateway 104 determines that the content of the content return message 204 should be stored in the cache 102, the network gateway can create and route, to the cache 102, a copy of the content 206. The cache 102 can receive the copy of the content 206 and store as appropriate. For example, the cache 102 or the network gateway 104 may determine an expiration time for the copy of the content 102, and the cache may store the content only until expiration. Additionally or alternatively, the cache may store the content with the original URL of the content, for example in order to locate the content when requested.

Figure 3:
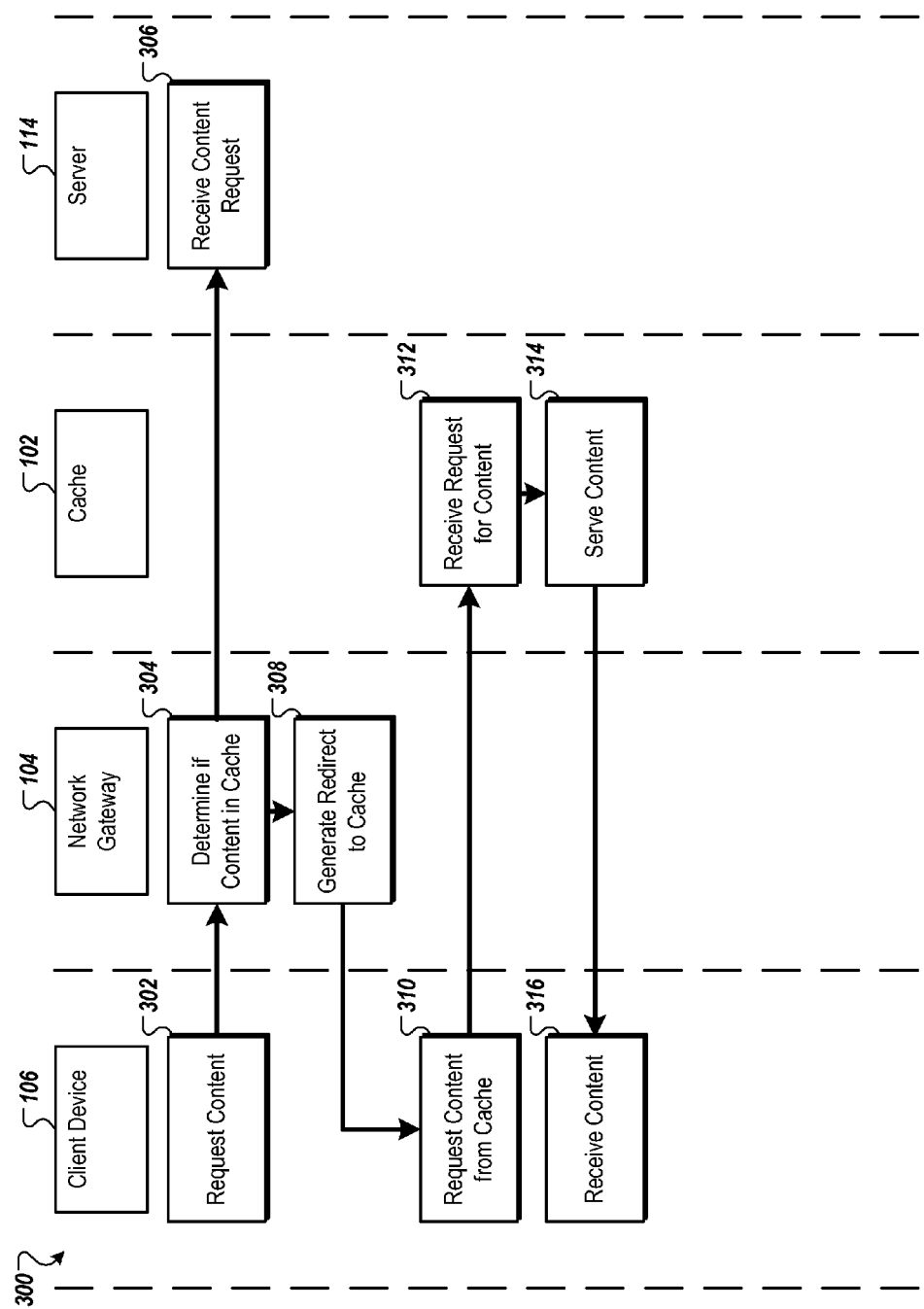
FIG. 3 is a swim-lane diagram of an example process for requesting content.

FIG. 3 is a swim-lane diagram of an example process 300 for requesting content. The process 300 is described with reference to the components shown in FIGS. 1 and 2. However, other components can be used to perform the process 300 or another similar process. In this example, the process uses the HTTP communication protocol. However, other communications protocols may be used in addition or in the alternative. If a different communication protocol is used, and if that other communication protocol allows for more than one data object (e.g., file, blob) per request, the cache 102 may be configured, in some cases, to serve all of the data objects requested in a single request. In this way, it may be possible for every content request to be responded to by only the cache 102 or only the webserver 114.

The client device 106 generates 302 a content request and sends the content request to the network gateway 104. For example, the client device 106 may have an initial HTTP connection with the server 114 to request a webpage. In order to load the webpage, the client device 106 may create and send multiple HTTP GET requests, each GET request specifying one HTTP resource. These GET requests may, in some cases, be sent in parallel from different ports of the client device 106, in accordance with the HTTP protocol.

The network gateway 104 receives the content request from the client device 104 and determines 304 if the content should be served from the cache 104 or the server 114. For example, for each of the HTTP GET requests, the network gateway 104 can determine if the specified HTTP resource should be served from the cache 102 or from the server 112. The network gateway 104 may test, for example, if the specified HTTP resource is listed as available from the cache 102, if the specified HTTP resource is listed as static in a list of known static resources if the specified HTTP resource has a file extension that indicates the HTTP resource is likely static, etc. Examples of file extension that indicate an HTTP resource is likely static include, but are not limited to, image (.jpg, .png) or audio (.wav) files.

If the network gateway 104 determines that the content should be served from the server 114, the network gateway 104 can send the content request to the server 114. The server 114 can receive 306 the content request and process as appropriate. For example, the server 114 can respond to each HTTP Get request with a reply containing the request HTTP resource. Two example processes that include the server 114 responding to a content requests are described with respect to FIGS. 4 and 5, below.

If the network gateway 104 determines that the content should be served from the cache 102, the network gateway 104 can generate 308 a redirect to the cache and send the redirect to the client device 106. For example, the network gateway 104 can issue a HTTP URL redirection command to the client device 104. Many types of HTTP URL redirection are possible, including but not limited to 402 HTTP redirect, server-side scripting, frame redirects, and Apache mod_rewrite. Regardless of the HTTP URL redirection used, the redirection can include sufficient information for the cache 102 to identify the originally requested content.

The client device 106 can receive the redirect from the network gateway 104 and request 310 the content from the cache 102. For example, the HTTP URL redirection may include metadata indicating the URL on the server 114 of the originally requested resource, and the client device 106 can request the content from the cache 102 in a message that includes that metadata. The cache 102 can receive 312 the redirected request for content from the client device 106 and serve 314 the content to the client device 106. The client device 106 can receive 316 the content from the cache 102.

Figure 4:
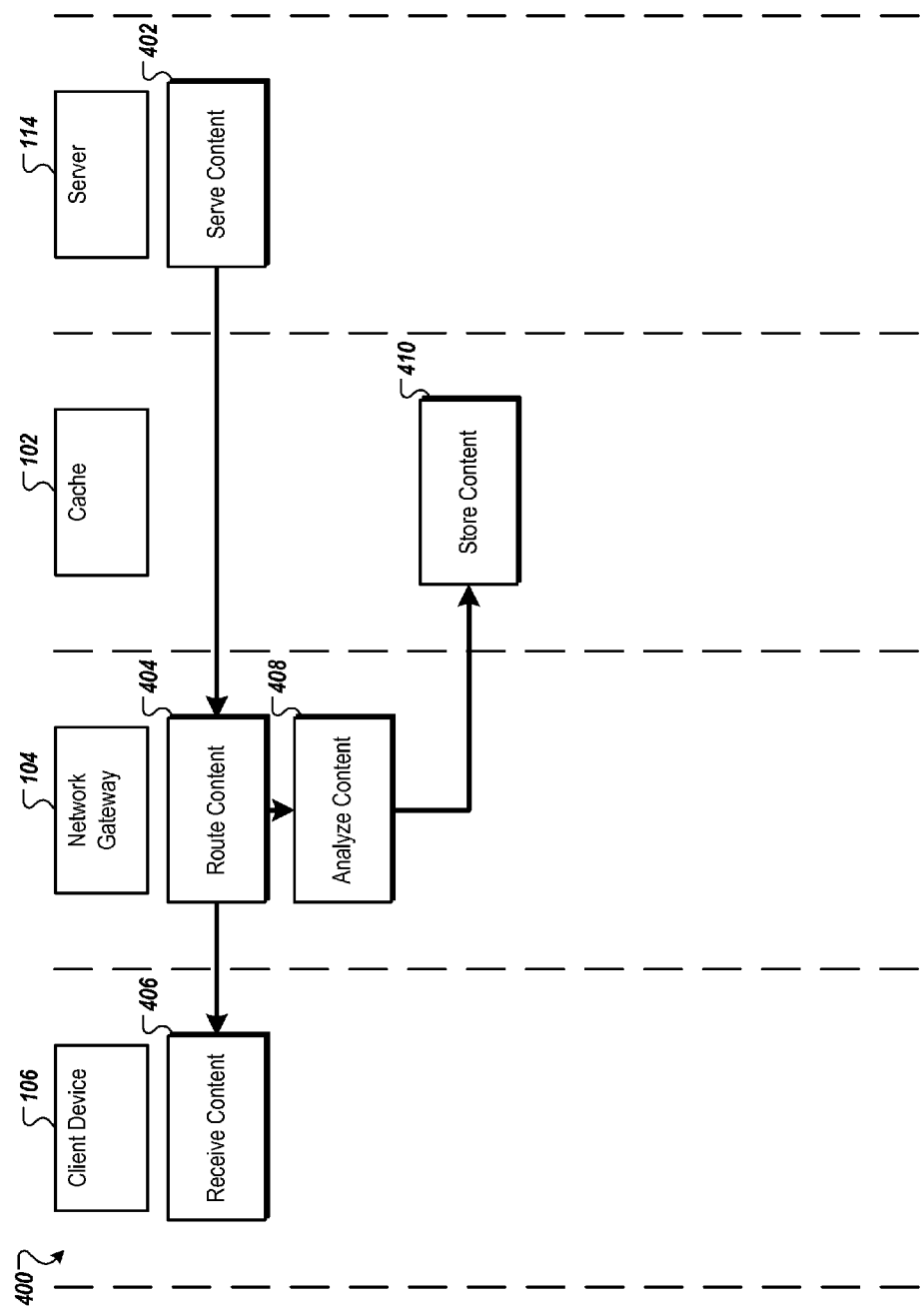
FIGS. 4 and 5 are swim-lane diagrams of example processes for storing content in a cache.

FIG. 4 is a swim-lane diagram of an example process 400 for storing content in a cache. The process 400 is described with reference to the components shown in FIGS. 1 and 2. However, other components can be used to perform the process 400 or another similar process. In this example, the process 400 uses the HTTP communication protocol. However, other communications protocols may be used in addition or in the alternative.

The server 114 serves 402 content for the client device 106. For example, the server 114 may receive one or more HTTP GET requests from the client device 106. In response, the server 114 may fetch and/or generate the HTTP resources specified in the HTTP GET request and send them in reply messages addressed to the client device 106. The network gateway 104 receives the served content and routes 404 the served content to the client device 106. The client device 106 receives 406 the content. For example, the client device may receive the reply messages, extract the HTTP resources, and display them in a web browser The network gateway 104 analyzes 408 the served content. For example, in parallel with, before, or after routing the reply messages, the network gateway 104 may also extract the HTTP resources for analysis. The network gateway, optionally using the static content analyzer 110, may apply one or more tests to the extracted content to determine if one or more of the HTTP resources should be stored in the cache 102. For example, the static content analyzer 110 may test the HTTP resources to determine if they are static. Such a test may include examining the file type of the HTTP resources. Another test may include comparing multiple copies of HTTP resources with the same address.

For example, a first user may request a resource at a particular URL, and a second user, at a later point in time, may request a resource with the same URL. These two resources may contain the same, or similar, data. For example, the resource may be a website's logo image file. In other cases, two resources with the same URL may have different data. A hypertext markup language (HTML) page at the address may be dynamically generated by the server 114 based on the user requesting the page (e.g., with personalized shipping information for an e-commerce website).

The network gateway 104 may store both resources with the same URL and compare them. If the two resources have the same data (or similar within an appropriate threshold), the network gateway 104 may determine that the resource is static. If the two resources have different data (or more different than the threshold), the network gateway 104 may determine that the resource at the shared URL is dynamic.

The threshold in the static determination may be used, for example, to account for transmission errors or changes that are undetectable by a user. For example, the same image at two different resolutions may be found to be within the threshold. In another example, an operating system disk image may be large enough that a transmission error is be possible, and thus a one or two bit difference may be within the threshold as well.

If the network gateway 104 determines that the content should be stored in the cache, the network gateway 104 sends the content to the cache 102. The cache 102 stores the content 410. For example, the cache 102 can store the resource, optionally encrypted and/or compressed. The cache may index the resource by the original URL used to request the resource. This may facilitate, for example, fast access if the cache 102 receives a request to serve the resource to the client device 106.

Figure 5:
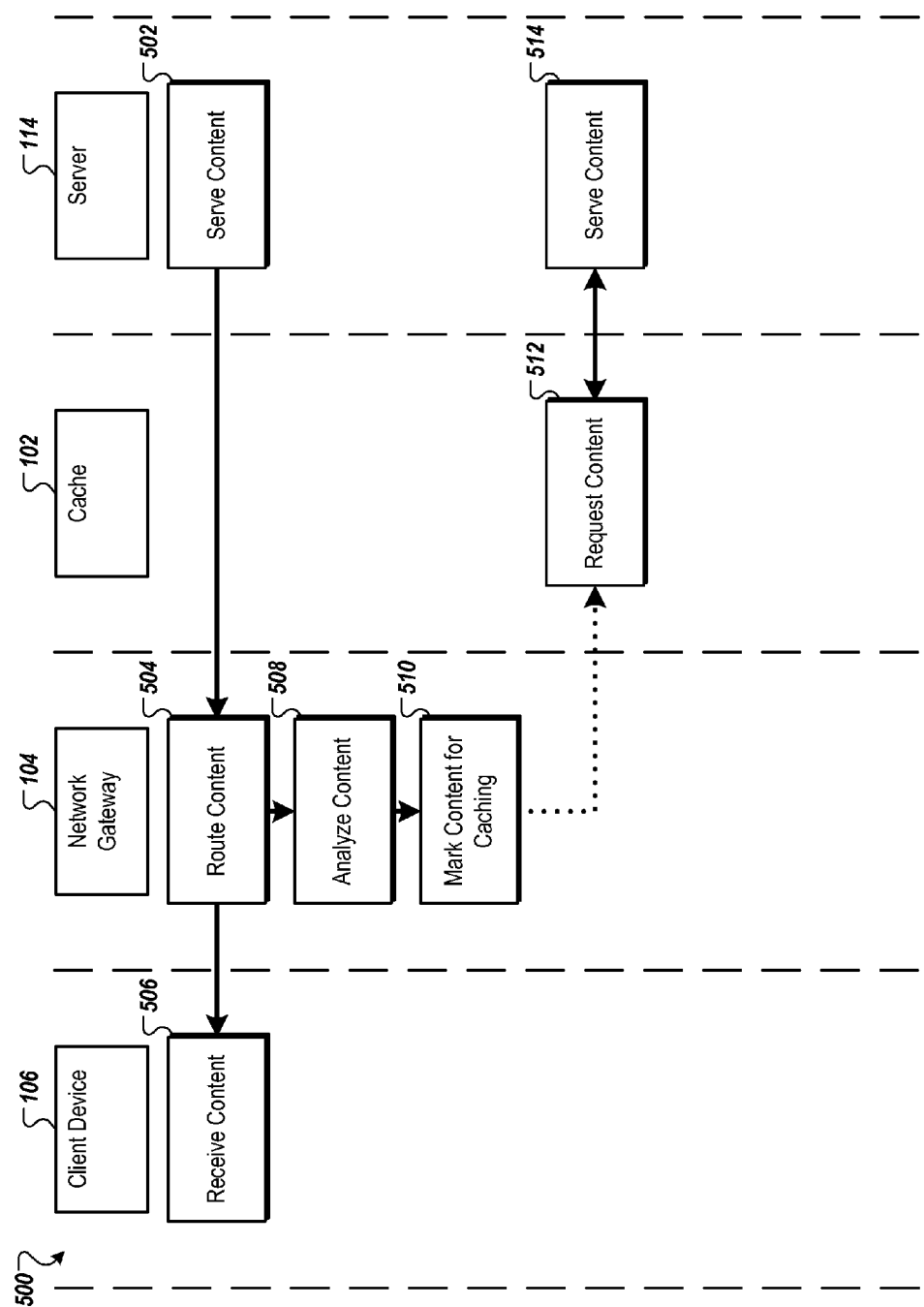

FIG. 5 is a swim-lane diagram of an example process 500 for storing content in a cache. The process 500 is described with reference to the components shown in FIGS. 1 and 2. However, other components can be used to perform the process 500 or another similar process. In this example, the process 500 uses the HTTP communication protocol. However, other communications protocols may be used in addition or in the alternative.

The server 114 serves 502 content for the client device 106. For example, the server 114 may receive one or more HTTP GET requests from the client device 106. In response, the server 114 may fetch and/or generate the HTTP resources specified in the HTTP GET request and send them in reply messages addressed to the client device 106. The network gateway 104 receives the served content and routes 504 the served content to the client device 106. The client device 106 receives 506 the content. For example, the client device may receive the reply messages, extract the HTTP resources, and display them in a web browser The network gateway 104 analyzes 508 the served content. For example, in parallel with, before, or after routing the reply messages, the network gateway 104 may also examine the HTTP response. The network gateway, optionally using the static content analyzer 110, may apply one or more tests to the HTTP response to determine if one or more of the HTTP resources should be stored in the cache 102. For example, the static content analyzer 110 may store one or more threshold values used to analyze the HTTP response. These thresholds can include, but are not limited to, object size, expiration, port number, transfer speed. A test of the HTTP response may compare one or more features of the HTTP response, a header of the HTTP response, or some other data bout the HTTP response to the thresholds. For example, a test of object size less than N mb and a connection speed of less than M mbps may be used. If a HTTP response is received at less than M mbps and if the HTTP response header indicates that the HTTP resource is less than N mb, then the HTTP response can be identified as passing the threshold test and should therefore be cached.

If the network gateway 104 determines that the content should be stored in the cache, the network gateway 104 marks 510 the content for caching. For example, the network gateway 104 can record the resource URL in a queue of resources to be cached. This queue may be a priority queue that orders the queue contents by a priority number. The network gateway 104 may calculate a priority number for each resource using, for example, one or more threshold tests. These threshold tests may be the same or different as used to analyze 508 the HTTP response to determine if the HTTP resource should be cached.

The cache 102 requests 512 the content and the server 114 serves 514 the content to the cache 102 for storage. For example, the cache 102 may retrieve the next resource to be cached from the priority queue of resources to be cached. In some configurations, the cache 102 may request 512 a resource from the server 114 any time there is a resource identified to be cached. In some configurations, the cache 102 may be configured to request 512 resources on a schedule, for example between 7:00 PM and 5:00 AM, when the connection to the Internet is expected to be low. In some configurations, the cache 102 may be configured to request 512 resources opportunistically. That is, the cache 102 may be configured to request 512 resources when the cache 102, the connection to the Internet, or when some other resource is being underutilized.

Once received, the cache 102 can store the resource, optionally encrypted and/or compressed. The cache may index the resource by the original URL used to request the resource. This may facilitate, for example, fast access if the cache 102 receives a request to serve the resource to the client device 106.

Figure 6:
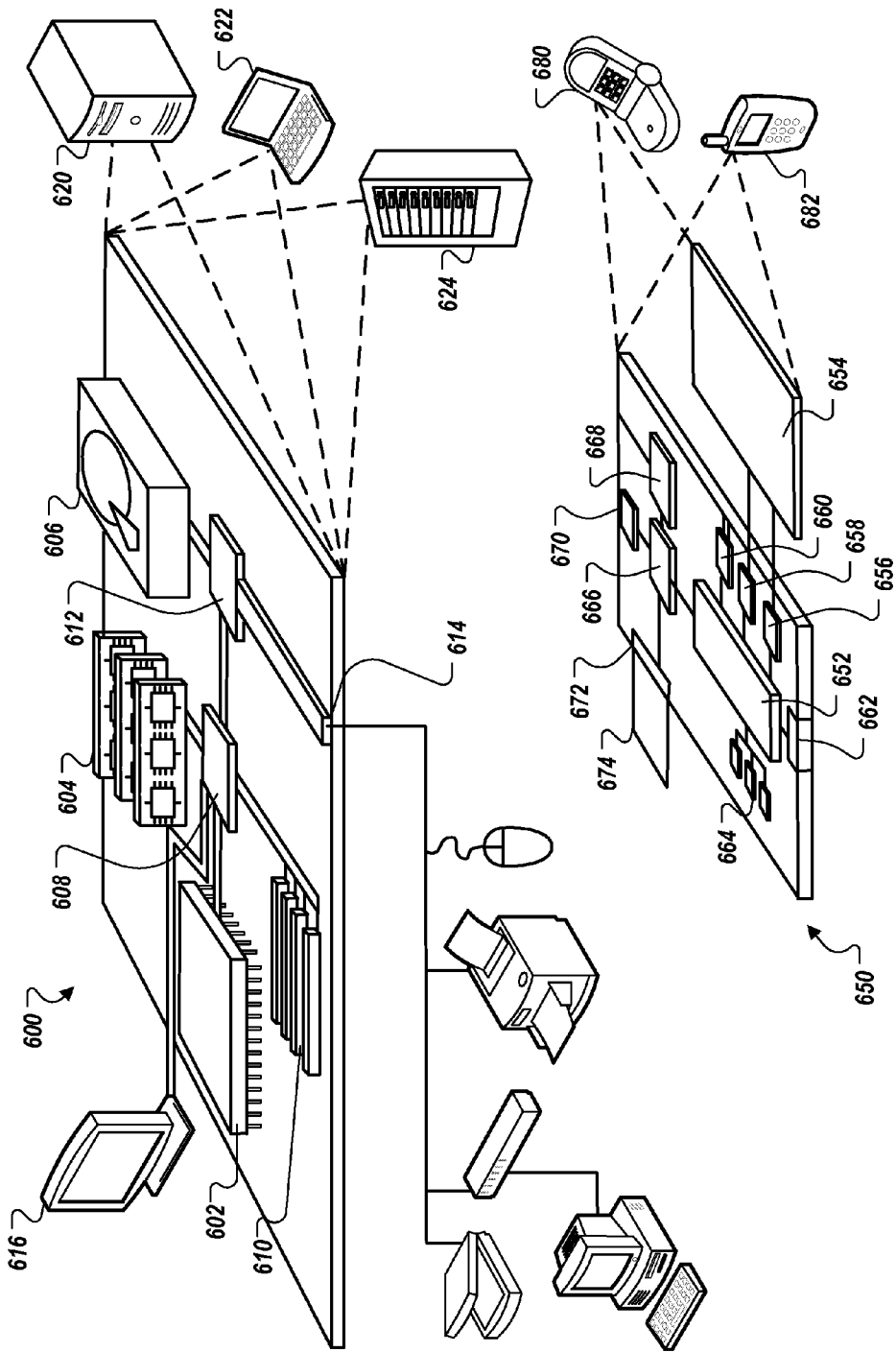
FIG. 6 is a schematic diagram that shows an example of a computing device and a mobile computing device.

FIG. 6 shows an example of a computing device 600 and an example of a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/ or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method performed by data processing apparatuses, the method comprising:
   routing, from a gateway within a network, a request by a client within the network for a webpage;
   routing, from the gateway to the client, a document associated with the webpage that identifies content to be embedded in the webpage;
   intercepting, at the gateway within the network, a request by the client for the content to be embedded in the webpage, the requested content associated with a server outside the network, the client having a direct connection with the server outside the network;
   determining, by the gateway within the network, whether a copy of the requested content is available in a cache within the network;
   if the copy of the requested content is determined to be available in the cache within the network, transmitting, by the gateway within the network, a redirect response to the client to cause the client to retrieve the copy of the requested content from the cache within the network;
   if the copy of the requested content is determined not to be available in the cache within the network, permitting the intercepted content request by the client to be transmitted to the server outside the network to cause the requested content to be retrieved via the direct connection between the server outside the network and the client within the network;
   monitoring content items returned to clients within the network by servers;
   determining that a first plurality of the content items are static; and
   responsive to determining that the first plurality of contents items are static, storing the first plurality of content items in the cache;
   wherein determining that the first plurality of content items are static comprises comparing two or more content items having a same name and determining that the content items having the same name contain identical data.

2. The method of claim 1 the method further comprising preventing, if the copy of the requested content is determined to be available in the cache within the network, the request from reaching the server outside the network.

3. The method of claim 1 wherein determining whether a copy of the requested content is available in a cache within the network comprises determining whether the content is static.

4. The method of claim 3 wherein determining if the content is static comprises examining a file extension of the content.

5. The method of claim 3 wherein determining whether the content is static comprises matching the resource to a list of known static contents.

6. The method of claim 1 wherein determining that the first plurality of content items are static comprises examining file extensions of the content items.

7. The method of claim 1 wherein determining that the first plurality of content items are static comprises comparing a message containing the content item returned to clients with a threshold.

8. The method of claim 1 wherein storing the first plurality of content items in the cache comprises requesting, from a server outside of the network, the first plurality of content items.

9. The method of claim 1 wherein the request is a Hypertext Transfer Protocol (HTTP) request, the content is a single HTTP resource, the redirect is an HTTP redirect, and the cache indexes stored content by HTTP resource name.

10. A non-transitory computer storage media encoded with computer program instructions that, when executed by one or more processors, cause a computer device to perform operations comprising:
    routing, from a gateway within a network, a request by a client within the network for a webpage;
    routing, from the gateway to the client, a document associated with the webpage that identifies content to be embedded in the webpage;
    intercepting, at the gateway within the network, a request by the client for the content to be embedded in the webpage, the requested content associated with a server outside the network, the client having a direct connection with the server outside the network;
    determining, by the gateway within the network, whether a copy of the requested content is available in a cache within the network;
    if the copy of the requested content is determined to be available in the cache within the network, transmitting, by the gateway within the network, a redirect response to the client to cause the client to retrieve the copy of the requested content from the cache within the network;
    if the copy of the requested content is determined not to be available in the cache within the network, permitting the intercepted content request by the client to be transmitted to the server outside the network to cause the requested content to be retrieved via the direct connection between the server outside the network and the client within the network;
    monitoring content items returned to clients within the network by servers;

determining that a first plurality of the content items are static; and responsive to determining that the first plurality of contents items are static, storing the first plurality of content items in the cache;

wherein determining that the first plurality of content items are static comprises comparing two or more content items having a same name and determining that the content items having the same name contain identical data.

11. The computer storage media of claim 10 the operations further comprising preventing, if the copy of the requested content is determined to be available in the cache within the network, the request from reaching the server outside the network.

12. The computer storage media of claim 10 wherein determining whether a copy of the requested content is available in a cache within the network comprises determining whether the content is static.

13. The computer storage media of claim 12 wherein determining if the content is static comprises examining a file extension of the content.

14. The computer storage media of claim 12 wherein determining whether the content is static comprises matching the resource to a list of known static contents.

15. The computer storage media of claim 10 wherein determining that the first plurality of content items are static comprises examining file extensions of the content items.

16. The computer storage media of claim 10 wherein determining that the first plurality of content items are static comprises comparing a message containing the content item returned to clients with a threshold.

17. The computer storage media of claim 10 wherein storing the first plurality of content items in the cache comprises requesting, from a server outside of the network, the first plurality of content items.

18. The computer storage media of claim 10 wherein the request is a Hypertext Transfer Protocol (HTTP) request, the content is a single HTTP resource, the redirect is an HTTP redirect, and the cache indexes stored content by HTTP resource name.

19. A system comprising:
one or more processors configured to execute computer program instructions; and
computer storage media encoded with computer program instructions that, when executed by one or more processors, cause a computer device to perform operations comprising:
routing, from a gateway within a network, a request by a client within the network for a webpage;
routing, from the gateway to the client, a document associated with the webpage that identifies content to be embedded in the webpage;
intercepting, at the gateway within the network, a request by the client for the content to be embedded in the webpage, the requested content associated with a server outside the network, the client having a direct connection with the server outside the network;
determining, by the gateway within the network, whether a copy of the requested content is available in a cache within the network;
if the copy of the requested content is determined to be available in the cache within the network, transmitting, by the gateway within the network, a redirect response to the client to cause the client to retrieve the copy of the requested content from the cache within the network;
if the copy of the requested content is determined not to be available in the cache within the network, permitting the intercepted content request by the client to be transmitted to the server outside the network to cause the requested content to be retrieved via the direct connection between the server outside the network and the client within the network;
monitoring content items returned to clients within the network by servers;
determining that a first plurality of the content items are static; and
responsive to determining that the first plurality of contents items are static, storing the first plurality of content items in the cache;
wherein determining that the first plurality of content items are static comprises comparing two or more content items having a same name and determining that the content items having the same name contain identical data.

20. The system of claim 19 the operations further comprising preventing, if the copy of the requested content is determined to be available in the cache within the network, the request from reaching the server outside the network.

21. The system of claim 19 wherein determining whether a copy of the requested content is available in a cache within the network comprises determining whether the content is static.

22. The system of claim 21 wherein determining if the content is static comprises examining a file extension of the content or matching the resource to a list of known static contents.

23. The system of claim 19 wherein determining that the first plurality of content items are static comprises comparing a message containing the content item returned to clients with a threshold.

24. The system of claim 19 wherein the request is a Hypertext Transfer Protocol (HTTP) request, the content is a single HTTP resource, the redirect is an HTTP redirect, and the cache indexes stored content by HTTP resource name.

* * * * *